United States Patent Office

3,564,071
Patented Feb. 16, 1971

3,564,071
PROCESS FOR DIMERIZATION OF α-OLEFINS
Shoichi Izawa, Shizuo Yamada, and Yaichiro Ono, Yamaguchi-ken, Japan, assignors to Toyo Soda Manufacturing Co., Ltd., Yamaguchi-ken, Japan
No Drawing. Filed Oct. 11, 1968, Ser. No. 766,969
Claims priority, application Japan, Oct. 19, 1967,
42/67,333
Int. Cl. C07c 3/10
U.S. Cl. 260—683.15                                12 Claims

ABSTRACT OF THE DISCLOSURE

Process of catalytic dimerization or co-dimerization of α-olefins comprising ethylene and/or propylene in the presence of the complex catalyst consisting of organoaluminum compounds and at least one of titanates selected from the group consisting of tri-alkyltitanates and tetraaryltitanates (e.g. tetra-phenyltitanates and/or tetra-tolyltitanate et al.).

BACKGROUND OF INVENTION

Among n-butenes, 1-butene having a terminal double bond is the important materials to produce poly-1-butene. At present, it is considered that B-B fraction from petroleum refinery plants is the source of 1-butene, however, besides 1-butene the said B-B fraction usually contain cis-2-butene, trans-2-butene, n-butene, and butadiene and the contents of 1-butene are reported in the range of 17–20 percent.

To separate 1-butene from B-B fraction is very tedious because the boiling points are very close to each other, so that it is not appropriate to ask for the B-B fractions as a source of 1-butene from economic point of view.

Poly-1-butene (i.e. polymers of 1-butene) have numerous excellent properties compared with polyethylene and polypropylene and used as reforming materials of polyethylene.

The said poly-1-butene are not yet present in the market because of the situations for supplying raw materials. Industrially, it is important and most desired to supply 1-butene at low cost.

Further, α-olefins having 5 to 6 carbon atoms in the molecules are considered as important raw materials for producing intermediate compounds of plastic and synthetic rubber as described later.

Hitherto, numerous processes for preparation of n-butene are described in the literature and it is very difficult to obtain 1-butene selectively because these butenes comprises isomers having analogous boiling points. Especially, the process for preparation of n-butene by dimerization of ethylene have been disclosed in numerous patents and in many cases, these processes have some disadvantages (e.g. low activity, low selectivity of 1-butene, need of high temperature and pressure). Up to now, the process for dimerization of ethylene to produce 1-butene are not yet securely established industrially. For example, according to the process of Japanese patent publication No. 5,067/1957, the mixture of triethylaluminum and tetrabutyltitanate or tetrabutylzirconate are employed as polymerization catalyst and ethylene is used as a raw materials for preparing mainly n-butene and small amounts of hexene and its homologues. Example 1 in the said process is reviewed as follows.

Reaction time 41 hrs.,
Amounts of product: 182 g.,
n-Butene produced: 161.8 g.,
1-butene produced: 108 g.,
Selectivity of 1-butene: 67%,
Titanates used as catalyst: n-butyltitanate 8.5 g. (25 mmol.) 1-butene (g.)/titanate (g.)×reaction time (hrs.): $108/8.5 \times 41 = 0.31$.

These values are insufficient as industrial catalysts.

Relating to the co-dimerization of ethylene and propylene, there have been tried a number of research and development for the purpose to obtain isoprene as the material for synthetic polyisoprene rubber and monomer of poly(3-methyl-1-butene) which has various characteristics as a new polymer, which has resulted in many patents. They are, for example, Japanese patent publication No. 2662/1959, Japanese patent publication No. 9,058/1962 and French Pat. No. 1,385,503. However, they are proved to have difficulties in that reaction conditions are severe, yields of reaction product are low, or unnecessary reaction products are by-produced. This actually means that it has not yet come to a stage of the establishment of a firm technology available for a commercial operation of the co-dimerization of ethylene and propylene.

Therefore, the current situation is that it has been desired to establish a process to produce these 3-methyl-1-butene, 2-methyl-2-butene and 2- methyl-1-butene etc. at a low cost.

Relating to the co-dimerization of propylene, considerable research and development have been made to obtain the monomer for the synthesis of poly(4-methyl-1-pentene), 2-methyl-1-pentene and 2-methyl-2-pentene for the synthesis of isoprene, which has resulted in many patents. They are, for example, French Pat. No. 1,385,503, Japanese patent publications No. 14,367/1960, No. 19,622/1964 and No. 20,249/1965. However, they are proved to have difficulties in a scale of commercial operation. Therefore, it has been desired to establish a process for the synthesis of these materials important for industries.

As the results of our researches, the new catalyst system for dimerization of ethylene or propylene, and co-dimerization of ethylene-propylene are discovered. Using these catalyst systems, the dimerization of ethylene was carried out somewhat quickly at ordinary temperature and pressure and hexenes in the products were relatively small and, further, the contents of 1-butene having a terminal double bond, was 99 percent or more among produced butenes. Then, these catalyst systems are also effective for dimerization of propylene and co-dimerization of ethylene-propylene, and these dimers and co-dimers contains 3-methyl-1-butene, 2-methyl-1-butene, 4-methyl-1-pentene and etc., having a terminal double bond selectively.

DETAILED DESCRIPTION OF INVENTION

In accordance with the present invention, the mixture of organoaluminum compounds (Compound A) and at least one of titanates selected from the group consisting of tri-alkyltitanates and tetraaryltitanates (Compound B) alone or in the appropriate solvents may be used as catalyst and dimerization of ethylene or propylene, or co-dimerization of ethylene and propylene may be carried by contacting the catalyst with ethylene, propylene, or mixture gas of ethylene-propylene at ordinary temperature or up to 150° C. and under atmospheric pressure or increased pressure.

Of our catalyst systems, the organoaluminum compounds (compound A) have a bond of aluminum atom and organic carbon atom in molecules and can be represented by the general formula $R_3Al$ or $R_2AlH$, wherein R is an alkyl group having 2 to 6 carbon atoms and trialkyltitonates or tetraaryltitanates (compound B) can be represented by the general formula of $Ti(OR')_3$ wherein R' is an alkyl group having 2 to 4 carbon atoms, or $Ti(OAr)_4$ wherein Ar an aryl group or its derivatives which are expressed by $—C_6H_5$,

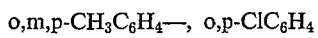

et al. These were prepared by the method of Nesmeyanov, Nogina and Freidlina (C.A. 50, 15413) or Yoshino et al. (T. Yoshino: Kogyo Kagaku Zasshi; 60 1124–25 ('57) J. Chem. Soc. Japan; Ind. Chem. Sect.)

Further, the compounds A and B are not defined limitedly as each one kind and if necessary, two kinds or more of compounds may be mixed and used as the said component A or B and these are comprised in category of the present invention. According to the present invention, the catalyst of two components which is obtained by making compounds A to contact with compound B, shows superior activity and a molar ratio of component A to B (A/B) shall be suitable within the range of from 1.0 to 5.0. If the value of A/B was smaller than 1.0, the formation of catalyst is not smoothly carried out and the catalyst exerts low activity. If the value A/B was over 5.0, the secondary reactions e.g. formation of solid materials having molecular weight and the like, is caused and the yield of dimers are lowered. As for the concentration of catalyst, the catalyst solutions which contains 3 mmol/l. or more of titanate is satisfactory used. In this case, if the concentration of catalyst was 3 mmol/l. or less, the activity of catalysts is weakened or lost by impurity in solvents and the reproducibility of dimerization is rapidly decreased.

Further, the reaction of ethylene proceed at a temperature of from 0° C. to 100° C. and if the reaction temperature was lower than 0° C. the reaction rate is decreased, on the ther hand, if the reaction temperature was higher than 100° C., the activity of catalyst is not shown so much by decomposition of catalyst system so that it was disclosed that a suitable temperature exists in the range of from 30° C. to 60° C., and the reaction of propylene or ethylene-propylene mixture proceed at the range of from 0° C. to 150° C., preferably from 60° C. to 80° C.

As for the solvents, aliphatic, aromatic, and alicyclic hydrocarbon (such as n-heptane, toluene, and cyclohexane) may be employed. Then a reaction may proceed at atmospheric pressure or increased pressure and the reaction rate increases with pressure.

The following examples will more particularly illustrate the novel process of this invention, however, it is to be understood that the examples are for the purpose of illustration only and are not intended to define or limit the scope of the invention.

Example I

The catalyst was prepared in 200 ml. autoclave with electromagnetic stirrer in a nitrogen filled dry box. 4 ml. of n-heptane containing 1.6 mmol of triethylaluminum was added to 0.54 mmol (0.2280 g.) of tetraphenyltitanate, then n-heptane was further added so as to a total volume may reach to 80 ml. The catalyst solution thus obtained was matured at 40° C. for 10 mins. and to which ethylene was introduced up to 15 kg./cm.² G. and then the reaction was carried out at the same temperature and pressure for 40 mins. After the reaction the autoclave was cooled at a temperature of −30° C. and the products in the reaction vessel were discharged through the trap which was cooled with solid carbon dioxide-methanol solutions. Further the reaction solution was heated and a product having low boiling point which contains namely n-butene was collected in the same trap. Then another product having high boiling point which contained hexene in the reaction solution was separated by distillation. These were respectively analyzed by means of gas-chromatography. The solid products were washed with hydrochloric methanol solution and then dried. Thus 19.4 g. of n-butenes (1-butene; 99.8 percent), 1.2 g. of hexene, and 0.6 g. of solid polymer were obtained. Here, the amounts of 1-butene produced per gram of titanate was calculated as below.

19.4 g./0.2280 g.=85.1 (1-butene g./g. titanate)

This value will be expressed as X in the following examples. For the next, theratio of 1-butene, hexene, and polymer among reaction products were 91.5, 5.6 and 2.9 percent respectively.

Example II

The following were mixed in an inert atmosphere in the autoclave as described in Example I; 0.53 mmol (0.221 g.) of tetraphenyltitanate and 1.58 mmol of triethylaluminum in 80 ml. n-heptane. Ethylene was then introduced at a pressure of 20 kg./cm.² at G. at 80° C. for 1 hr. As the results of the reaction, 13.3 g. of n-butene (1-butene; 99.8 percent), 1.9 g. of hexene, and 0.1 g. of solid polymer were obtained and the value of X was 60.2.

Example III

As described in Example I; to 80 ml. of n-heptane solution containing 0.56 mmol (0.2371 g.) of tetraphenyltitanate and 1.75 mmol of triisobutylaluminum, ethylene was introduced at a pressure of 30 kg./cm.² G. at 30° C. for one hour. Thus, 25 g. of n-butene (1-butene; 99.6 percent), 1.7 g. of hexene and 1.4 g. of solid polymer were obtained and the value of X was calculated at 105.4.

Example IV

As described in Example I; ethylene was introduced to 80 ml. of toluene solution containing 0.5 mmol (0.2100 g.) of tetraphenyltitanate and 1.5 mmol of triethylaluminum at a pressure of 20 kg./cm.² G. at 0° C. for one hour. Thus, 7.9 g. of n-butene (1-butene; 99.7 percent), 0.3 g. of hexene, and 0.4 g. of solid polymer were obtained. The value of X was calculated at 37.6.

Example V

As described in Example I; ethylene was introduced to 80 ml. of catalyst solution (cyclohexane was employed as solvents) containing 1.6 mmol (0.6840 g.) of tetraphenyltitanate and 8.1 mmol of diisobutylaluminum hydride at a pressure of 15 kg./cm.² G. at 30° C. for one hour. Thus, 12.1 g. of n-butene (1-butene; 99.3 percent), 0.7 g. of hexene and 3.5 g. of solid polymer were obtained. The ratio of n-butene, hexene, and solid polymer among reaction products, were 74.5, 4.0 and 21.5 percent respectively. The value of X was 17.7.

Example VI

As described in Example I; ethylene was introduced to 80 ml. of catalyst solution containing 0.25 mmol (0.1035 g.) of tetraphenyltitanate and 0.98 mmol of triethylaluminum at a pressure of 15 kg./cm.² G. at 60° C. for one hour. Thus, 19.4 g. of n-butene (1-butene; 99.8 percent), 1.4 g. of hexene and 0.2 g. of solid polymer were obtained and the value of X was calculated at 187.4.

Example VII

As described in Example I; ethylene was charged into 80 ml. of n-heptane solution containing 0.89 mmol (0.3750 g.) of tetraphenyltitanate and 0.9 mmol of triethylaluminum at atmospheric pressure at 30° C. for 2 hrs. Thus 20 g. of n-butene (1-butene; 99.9 percent), a small amount of hexene, and solid polymer were obtained.

Example VIII

As described in Example I; ethylene was introduced to 80 ml. of catalyst solution containing 0.53 mmol (0.2213 g.) of tetraphenyltitanate and 1.6 mmol of triethylaluminum at a pressure of 15 kg./cm.$^2$ G. at 30° C. for 6 hrs. Thus 32.4 g. of n-butene (1-butene; 99.8 percent), 2.0 g. of hexene, and 1.2 g. of solid polymer were obtained and the value of X was 146.4.

Example IX

As described in Example I; ethylene was introduced to 80 ml. of n-heptane solution containing 0.53 mmol (0.2227 g.) of tetraphenyltitanate and 1.59 mmol of triethylaluminum at the pressure of 20 kg./cm.$^2$ G. at 60° C. for one hour. Thus 54.7 g. of n-butene (1-butene; 99.8 percent), 5.0 g. of hexene and 0.8 g. of solid polymer were obtained and the value of X was calculated at 245.6.

Example X

As described in Example I; ethylene was introduced to 80 ml. of n-heptane solution containing 0.58 mmol of tetra-p-tolyltitanate [Ti(O—C$_6$H$_4$CH$_3$)$_4$; 0.2770 g.] and 1.74 mmol of triethylaluminum at the pressure of 15 kg./cm.$^2$ G. at 40° C. for 40 mins. Thus 20.6 g. of n-butene (1-butene; 99.8 percent), 1.3 g. of hexene, and 0.7 g. of solid polymer were obtained and the value of X was calculated at 74.4.

Example XI

The procedure was as described in Example X; except that the tetra-p-tolyltitanate and triethylaluminum are replaced by 0.55 mmol of tetra-o-tolyltitanate [Ti(O—C$_6$H$_4$—CH$_3$)$_4$; 0.2630 g.] and 2.8 mmol of trihexyl-aluminum. As the results, 9.1 g. of n-butene (1-butene; 99.1 percent), 0.8 g. of hexene, and 1.6 g. of solid polymer were obtained and the value of X was 34.6.

Example XII

As described in Example I; ethylene was introduced to 80 ml. of n-heptane solution containing 0.59 mmol of tetra-p-chlorophenyltitanate [Ti(O—C$_6$H$_4$Cl)$_4$; 0.3326 g.] and 1.79 mmol of tri-n-propylaluminum at a pressure of 15 kg./cm.$^2$ G. at 40° C. for 40 mins. As the result, 13.3 g. of n-butene (1-butene; 99.6 percent), 0.9 g. of hexene, and 1.4 g. of solid polymer were obtained and the value of X was calculated at 40.0.

Example XIII

As described in Example I; ethylene was introduced to 80 ml. of n-heptane solution containing 0.59 mmol of tetra-o-chlorophenyl-titanate [Ti(O—C$_6$H$_4$Cl)$_4$; 0.3310 g.] and 3.0 mmol of tri-n-butylaluminum at a pressure of 15 kg./cm.$^2$ G. at 40° C. for 40 mins. Thus, 8.1 g. of n-butene (1-butene; 99.7 percent), 1.1 g. of solid polymer, and the small amounts of hexene were obtained.

Example XIV

As described in Example I; ethylene was introduced to 80 ml. of n-heptane solution containing of 0.58 mmol of tetra-p-nitrophenyltitanate [Ti(OC$_6$H$_4$NO$_2$)$_4$; 0.3515 g.] and 2.9 mmol of triethylaluminum at a pressure of 15 kg./cm.$^2$ G. at 40° C. for 40 mins. Thus, 1 g. of n-butene, 4.8 g. of solid polymer, and the small amounts of hexene were obtained.

Example XV

As described in Example I; ethylene was introduced into 80 ml. of n-heptane solution containing 0.56 mmol of tetra-m-tolyltitanate [Ti(OC$_6$H$_4$CH$_3$); 0.267 g.] and 1.8 mmol of triethylaluminum at a pressure of 15 kg./cm.$^2$ G. at 40° C. for 40 mins. Thus, 13.8 g. of n-butene (1-butene, 99.8%), 1.2 g. of hexene, and 0.9 g. of solid polymer were obtained.

Example XVI

The procedure is as described in Example XV; except that 1.8 mmol of triethylaluminum is replaced by 2.8 mmol of triethylaluminum. As the results, 6.0 g. of n-butene (1-butene; 99.8%), 0.6 g. of hexene, and 3.0 g. of solid polymer were obtained.

Example XVII

As described in Example I; ethylene was introduced into 80 ml. of n-heptane solution containing 0.844 mmol of tetra-p-tert-butylphenyltitanate [Ti(OC$_6$H$_4$C$_4$H$_9$)$_4$, 0.544 g.] and 4.22 mmol of triethylaluminum at a pressure of 15 kg./cm.$^2$ G. at 40° C. for 40 mins. Thus, 51.8 g. of n-butene (1-butene; 99.7%), 9.1 g. of hexene and 0.7 g. of solid polymer were obtained and the value of X was 95.2.

Example XVIII

As described in Example I; ethylene was introduced into 80 ml. of n-heptane solution containing 0.612 mmol of tetra-p-tert-amylphenyltitanate [Ti(OC$_6$H$_4$C$_5$H$_{11}$)$_4$; 0.429 g.] and 3.06 mmol of triethylaluminum at a pressure of 10 kg./cm.$^2$ G. at 75° C. for one hour. Thus, 28.8 g. of n-butene (99.4% of 1-butene), 6.1 g. of hexene and 1.0 g. of solid polymer. Thus the value of X was 67.1.

Example XIX

As described in Example I; ethylene was introduced into the solution of n-heptane containing 0.568 mmol of tetra-p-phenylphenyltitanate [Ti(OC$_6$H$_4$C$_6$H$_5$)$_4$; 0.4118 g.] and 2.84 mmol of triethylaluminum at a pressure of 10 kg./cm.$^2$ G. at 75° C. for one hour. Thus, 23.4 g. of n-butene (1-butene; 99.4%), 4.3 g. of hexene and 0.1 g. of solid polymer were obtained and the value of X was calculated at 56.8.

Example XX

As described in Example I; ethylene was introduced into 80 ml. of n-heptane solution containing 0.570 mmol of tetra-3,4-dimethyl phenyltitanate [Ti{OC$_6$H$_3$(CH$_3$)$_2$}$_4$; 0.3036 g.] and 2.28 mmol of triethylaluminum at a pressure of 10 kg./cm.$^2$ G. at 75° C. for one hour. Thus, 19.1 g. of n-butene (1-butene; 99.5%), 3.1 g. of hexene and 1 g. of solid polymer were obtained and the value of X was 62.9.

Example XXI

As described in Example I, ethylene was introduced into 80 ml. of n-heptane solution containing 0.76 mmol of tri-n-butoxytitanium (0.204 g.) and 2.2 mmol of triethylaluminum at a pressure of 10 kg./cm.$^2$ G. at 30° C. for 4 hrs. As the results of analyzation, 25.3 g. of n-butene (1-butene 99.8%), 1.6 g. of hexene and 1.6 g. of solid polymer were obtained and the value of X was 123.8. The ratio of 1-butene, hexene and polymer product were 88.8%, 5.6% and 5.6%, respectively.

Example XXII

As described in Example I; ethylene was introduced into 80 ml. of n-heptane solution containing 1.56 mmol of tri-n-butoxytitanium (0.42 g.) and 7.8 mmol of triethylaluminum at a pressure of 15 kg./cm.$^2$ G. for 2 hrs. Thus, 1 g. of n-butene (1-butene; 98.1%), 0.1 g. of hexene and 5.0 g. of solid polymer were obtained.

Example XXIII

The catalyst was prepared in 100 ml. stainless ampoule in a nitrogen filled dry box. 40 ml. of n-heptane containing 0.38 mmol of tri-n-butoxytitanium (0.1 g.) and triisobutylaluminum was maturld at 30° C. for 10 mins. and to which ethylene was introduced up to 15 kg./cm.$^2$ G. and then reaction was carried out for one hour. Thus, 1.2 g. of butene containing 99% of 1-butene, a small amount of hexene and solid polymer were obtained.

Example XXIV

As described in Example XXIII; ethylene was contacted with 40 ml. of catalyst solution containing 0.41 mmol of tri-n-proproxytitanium (0.092 g.) and 9.81 mmol of diisobutylaluminum hydride, and reaction was carried out at a pressure of 15 kg./cm.$^2$ G. at 85°G. for 2 hrs. Thus, 1.5 g. of n-butene (1-butene; 99.0%), a small amount of hexane, and solid polymer were obtained.

Example XXV

As described in Example XXIII; to 40 ml. of n-heptane solution containing of 0.35 mmol of tri-ethoxytitanium (0.64 g.) and 0.7 mmol of tripropylaluminum, ethylene was introduced at a pressure of 55 kg./cm.$^2$ G. at 30° C. for 2 hrs. Thus, 4 g. of n-butene (1-butene; 99.8%), 0.15 g. of hexane and 0.1 g. of solid polymer were obtained and the value of X was calculated at 105.4.

Example XXVI

As described in Example XXIII; ethylene was introduced to 40 ml. of n-heptane solution containing 0.36 mmol of tri-n-butoxytitanium (0.097 g.) and 0.73 mmol of triethylaluminum at a pressure of 15 kg./cm.$^2$ G. at 0° C. for 2 hrs. Thus, 1 g. of n-butene (1-butene; 99%), a small amount of hexene, and solid polymer were obtained.

Example XXVII

As described in Example I; ethylene was introduced to 80 ml. of n-heptane solution containing 0.79 mmol of tri-n-butoxytitanium (0.211 g.) and 2.37 mmol of triethylaluminum at a pressure of 15 kg./cm.$^2$ G. at 30° C. for 3.5 hrs. Thus, 33.9 g. of butene (1-butene; 99.6%), 4.2 g. of hexene, and 2.0 g. of solid polymer were obtained. The value of X was calculated at 160.6. The ratio of n-butene, hexene and solid polymer among reaction products were 84.8, 10.5 and 4.7 percent respectively.

Example XXVIII

The following were mixed in 200 ml. autoclave; 0.97 mmol (0.4627 g.) of tetraphenyltitanate, and 2 ml. of n-heptane containing 2.9 mmol of triethylaluminum and 50 ml. of n-heptane, and then 35 g. of propylene were introduced into the said autoclave. The pressure in the autoclave showed 16 kg./cm.$^2$ G. as it was kept at 60° C. and then ethylene was introduced into the reaction system at a pressure of 18 kg./cm.$^2$ G. at 60° for 2 hrs. After 2 hrs., the products in the autoclave were collected in a cooling trap and the products having high boiling points were separated by distillations. These products were analysed by gas-chromatography and the following results were obtained. It was obtained that 3.7 g. of n-butenes (1-butene; 99%), 3.4 g. of pentenes (3-methyl-1-butene; 28%, 2-methyl-1-butene; 72%), and 0.6 g. of hexene (4-methyl-1-pentene; 20.5%, 4-methyl-2-pentene; 47.5%, 2-methyl-1-pentene; 14.4%, 2-ethyl-1-butene; 10.0% and 7.4% of unknown materials).

Example XXIX

As described in Example XXVIII; 35 g. of propylene was added to 50 ml. of n-heptane solution containing 1.06 mmol (0.5902 g.) of tetra-p-chlorophenyltitanate and 3.2 mmol of triethylaluminum, and a temperature was kept at 40° C., a pressure in the reactor was reached to 10 kg./cm.$^2$ G. Then ethylene was introduced at a pressure of 14 kg./cm.$^2$ G. at 40° C. for 2 hrs. Thus 4.8 g. of n-butene (98.2% of 1-butene, and others), 2.5 g. of pentene (3-methyl-1-butene; 28%, 2-methyl-1-butene; 71.8%, and others), and 0.2 g. of hexene (4-methyl-1-pentene; 18.2%, 4-methyl-2-pentene; 52.2%, 2-methyl-1 pentene; 11.3, 2-ethyl-1-butene; 12.0%, and others).

Example XXX

As described in Example XXVIII; 35 g. of propylene was charged in 50 ml. of n-heptane solution containing 1.04 mmol (0.4956 g.) of tetra-p-tolyltitanate and 3.2 mmol of triethylaluminum, and as a temperature was kept at 60° C., the pressure in the autoclave was reached to 16 kg./cm.$^2$ G., then ethylene was introduced at a pressure of 20 kg./cm.$^2$ G. at 60° C. for 2 hrs. Thus, it was obtained that 2.5 g. of n-butenes (1-butene; 98.5% and others i.e. 2-butene), 1,4 g. of pentenes (3-methyl-1-butene; 36%, 2-methyl-1-butene; 64%), and 0.4 g. of hexenes (4-methyl-1-pentene; 27%, 4-methyl-2-pentene; 15.5%, 2-methyl-1-pentene; 10.9% and 2-ethyl-1-butene; 45.0%).

Example XXXI

As described in Example XXVIII; 32 g. of propylene was added to 40 ml. of n-heptane solution containing 1.8 mmol (0.47 g.) of tri-n-butoxytitanium and 8.8 mmol of triethylaluminum, and as a temperature was kept at 60° C., a pressure in the reactor was reached to 18 kg./cm.$^2$ G. Then ethylene was introduced at a pressure of 18 kg./cm.$^2$ G. at 60° C. for 3.5 hrs. Thus, 3.3 g. of reaction products were obtained. The ratio of each fraction among above product were 51 wt. percent of n-butenes (1-butene; 88.2%, trans-2-butene; 7.1%, cis-2-butene; 1.1% and others), 44.4 wt. percent of pentenes (3-methyl-1-butene; 32.9%, 2-methyl-1-butene; 32.9%, 2-methyl-1-butene; 57.5%, and others), and 4.6 wt. percent hexenes (4-methyl-1-pentene; 18.8%, 4-methyl-2-pentene; 31.3%, 2-methyl-1-pentene; 12.5%, 2-ethyl-1-butene 25.0% and others).

Example XXXII

As described in Example XXVIII, 32 g. of propylene was added to 40 ml. of n-heptane solution containing 1.9 mmol (0.51 g.) of tri-n-butoxytitanium and 9.5 mmol of triethylaluminum, and as a temperature was kept at 75° C., a pressure in the reactor was reached to 21 kg./cm.$^2$ G. Then ethylene was introduced at a pressure of 21 kg./cm.$^2$ G. at 75° C. for 3.5 hrs. Thus, 3 g. of reaction products containing 68.8 wt. percent of n-butenes (1-butene; 90.0%, trans-2-butene; 7.8%, cis-2-butene; 0.5% and others), 24.6 wt. percent of pentenes (3-methyl-1-butene; 36.0%, 2-methyl-1-butene; 57.8%, 1-pentene; 3.5% and others), and 6.6 wt. percent of hexenes (4-methyl-1-pentene; 23.5%, 2-methyl-1-pentene; 17.8%, 2-ethyl-1-pentene; 41.2% and 4-methyl-2-pentene; 17.5%) were obtained.

Example XXXIII

As described in Example XXVIII; 30 g. of propylene was charged in 50 ml. of n-heptane solution containing 1.7 mmol (0.45 g.) of tri-n-butoxytitanium and 17.0 mmol of triethylaluminum, and as a temperature was kept at 110° C., the pressure in the reactor was reached to 24 kg./cm.$^2$ G. Then, ethylene was introduced at same pressure and same temperature for 3.5 hrs. As the results, 2.4 g. of reaction products were obtained, and these products were composed of 37.5 wt. percent of n-butenes (1-butene; 39.2 wt. percent, trans-2-butene; 47.8 wt. percent, cis-2-butene; 5.1 wt. percent, and others), 50.0 wt. percent of pentenes (3-methyl-1-butene; 35.8%, 2-methyl-1-butene; 51.0%, 2-methyl-2-butene; 5.7%, 2-pentene; 2.6% and others), and 12.5 wt. percent of hexenes (4-methyl-1-pentene; 18.8%, 2-methyl-1-pentene; 18.8%, 4-methyl-2-pentene; 32.0%, 2-ethyl-1-butene; 17.6% and others; 12.8%).

Example XXXIV 35 g. of propylene was charged into 50 ml. of n-heptane solution containing 1 mmol (0.42 g.) of tetraphenyltitanate and 2.9 mmol of triethylaluminum and the reaction was carried out under the pressure of 16 kg./cm.$^2$ G. at 60° C. for 2 hrs. Thus, 0.4 g. of products were obtained and these hexenes contained 20.6% of 4-methyl-1-pentene, 44.5% of 4-methyl-2-pentene, 12.0% of 2-methyl-1-pentene and others.

Example XXXV

As described in the Example XXXIV; 35 g. of propylene was charged into 50 ml. of n-heptane solution containing 0.99 mmol (0.4734 g.) of tetra-o-tolyltitanate and 4.97 mmol of triethylaluminum and the reaction was carried out under the pressure of 16 kg./cm.$^2$ G. at 60° C. for 2 hrs. Thus, 0.8 g. of reaction products were obtained and these contained 0.4 g. of solid polymer and 0.4 g. of hexenes, composition of which were the same as shown in Example XXXIV.

Example XXXVI

As shown in Example XXXIV; 35 g. of propylene was charged in 50 ml. of n-heptane solution containing of 1.07 mmol (0.5993 g.) of tetra-p-chlorophenyltitanate and 6.4 mmol of triethylaluminum and then reaction were carried out at the pressure of 10 kg./cm.$^2$ G. at 40° C. for 3 hrs. Thus, 1.5 g. of reaction products were obtained, among these 1.0 g. of solid polymer and 0.5 g. of hexenes (4-methyl-1-pentene; 11.3%, 4-methyl-2-pentene; 51.0%, 2-methyl-1-pentene; 15.0%, a small amount of 2-ethyl-1-butene and others).

Example XXXVII

As shown in Example XXXIV; 26 g. of propylene was charged into 30 ml. of n-heptane solution containing 1.73 mmol (0.39 g.) of tri-n-propoxytitanium and 8.7 mmol of diisobutylaluminum hydride, and then reaction was carried out at 75° C. for 4 hrs. While in this reaction, the pressure in the reactor decreased from 20 kg./cm.$^2$ G. to 10 kg./cm.$^2$ G. Thus, 2 g. of hexenes (4-methyl-1-pentene; 11%, 2-methyl-1-pentene; 25.7%, 4-methyl-2-pentene; 30.3%, and others) were obtained.

Example XXXVIII

As shown in Example XXXIV; 25 g. of propylene was charged into 40 ml. of n-heptane solution containing 2.6 mmol (0.68 g.) of tri-n-butoxytitanium and 25.6 mmol of triethylaluminum, and then reaction was carried out at 75° C. for 4 hrs. While in this reaction, the pressure in the reactor decreased from 15 kg./cm.$^2$ G. to 5 kg./cm.$^2$ G. Thus, 3 g. of hexenes (4-methyl-1-pentene; 30%, 2-methyl-1-pentene; 28.5%, 4-methyl-2-pentene; 20% and others) were obtained.

What is claimed is:

1. Process for the dimerization or co-dimerization of α-olefin having 2 to 3 carbon atoms per molecule, which comprises contacting said α-olefin with a binary catalyst consisting of (A) at least one organic aluminum compound selected from the group consisting of $R_3Al$ and $R_2AlH$, wherein R is an alkyl group having 2 to 6 carbon atoms and (B) at least one titanate compound selected from the group consisting of Ti(OAr)$_4$ and Ti(OR')$_3$, wherein Ar is an aryl group and R' is an alkyl group having 2 to 4 carbon atoms.

2. Process according to claim 1, in which the molar ratio of said organic aluminum compound to said titanate is within the range of from 1.0 to 5.0.

3. Process according to claim 1, in which ethylene is dimerized.

4. Process according to claim 3, in which dimerization is carried out at the temperature range from 0° C. to 100° C.

5. Process according to claim 1, in which propylene is dimerized.

6. Process according to claim 5, in which dimerization is carried out at the temperature range from 0° C. to 150° C.

7. Process according to claim 1, in which ethylene and propylene are co-dimerized.

8. Process according to claim 7, in which co-dimerization is carried out at the temperature range from 0° C. to 150° C.

9. Process for the dimerization or co-dimerization of an α-olefin having 2 to 3 carbon atoms per molecule, which comprises contacting said α-olefin with a binary catalyst consisting of (A) at least one alkyl-aluminum compound selected from the group consisting of $R_3Al$ and $R_2AlH$, wherein R is an alkyl group having 2 to 6 carbon atoms and (B) at least one titanate selected from the group consisting of Ti(OAr)$_4$, wherein the Ar group is selected from the group consisting of phenyl, lower alkyl phenyl, and halophenyl and nitrophenyl, said catalyst containing from 1.0 to 5.0 mole of component (A) per mol of component (B).

10. Process for the dimerization or co-dimerization of α-olefin having 2 to 3 carbon atoms per molecule, which comprises contacting said α-olefin with a binary catalyst consisting of (A) at least one organic aluminum compound selected from the group consisting of $R_3Al$ and $R_2AlH$, wherein R is an alkyl group containing 2 to 6 carbons atoms and (B) at least one tri-alkoxy-titanium compound selected from the group consisting of Ti(OR)$_3$ wherein R is an alkyl group having 2 to 4 carbon atoms.

11. Process for dimerization or co-dimerization of α-olefins in which α-olefins having 2 to 3 carbon atoms are contacted with a binary catalyst consisting of at least one of the organic aluminum compounds selected from the group consisting of $R_3Al$ and $R_2AlH$, wherein said R is the alkyl group having 2 to 6 carbon atoms, and at least one of the titanates selected from the group consisting of Ti(OAr)$_4$, wherein said Ar is the aryl group selected from phenyl, tolyl, chlorophenyl, and nitrophenyl, and having molar ratio of the organic aluminum compound to the titanate in the range from 1.0 to 5.0.

12. Process for dimerization or co-dimerization of α-olefins in which α-olefins having 2 to 3 carbon atoms are contacted with catalyst comprising at least one organic aluminum compound selected from the group consisting of $R_3Al$ and $R_2AlH$, wherein said R is the alkyl group having 2 to 6 carbon atoms, and at least one titanate selected from the group consisting of Ti(OR')$_3$, wherein said R' is the alkyl group having 2 to 4 carbon atoms, and having molar ratio of the organic aluminum compound to the titanate in the range from 1.0 to 5.0.

References Cited

UNITED STATES PATENTS

| | | | |
|---|---|---|---|
| 2,943,125 | 6/1960 | Ziegler et al. | 260—683.15 |
| 2,959,576 | 11/1960 | Payne | 260—93.7X |
| 3,073,811 | 1/1963 | Natta et al. | 260—93.7 |
| 3,113,986 | 12/1963 | Breslow et al. | 252—429X |

PAUL M. COUGHLAN, Jr., Primary Examiner

U.S. Cl. X.R.

252—431; 260—94.9